US009221134B2

(12) United States Patent
Haimer

(10) Patent No.: US 9,221,134 B2
(45) Date of Patent: Dec. 29, 2015

(54) SHRINKING COIL WITH DIRECT TOOL COOLING

(75) Inventor: Franz Haimer, Igenhausen (DE)

(73) Assignee: Franz Haimer Machinenbau KG, Igenhausen (DE)

(*) Notice: Subject to any disclaimer, the term of this patent is extended or adjusted under 35 U.S.C. 154(b) by 931 days.

(21) Appl. No.: 12/628,017

(22) Filed: Nov. 30, 2009

(65) Prior Publication Data
US 2010/0133262 A1 Jun. 3, 2010

Related U.S. Application Data

(63) Continuation of application No. PCT/EP2008/003223, filed on Apr. 22, 2008.

(30) Foreign Application Priority Data

Jun. 1, 2007 (DE) ............... 20 2007 007 837 U

(51) Int. Cl.
*H05B 6/10* (2006.01)
*B23P 11/02* (2006.01)
(Continued)

(52) U.S. Cl.
CPC ............ *B23P 11/027* (2013.01); *H05B 6/14* (2013.01); *H05B 6/06* (2013.01); *H05B 6/105* (2013.01); *Y10T 279/23* (2015.01)

(58) Field of Classification Search
CPC .......... H05B 6/105; H05B 6/362; H05B 6/38; H05B 6/02; H05B 6/102; H05B 6/06; H05B 6/42; H05B 6/108; C21D 1/42; C21D 9/40; C21D 9/32; C21D 9/30; B23K 13/02; B21J 9/08; B05D 3/0272; B23B 31/28; B23B 31/117; B23B 31/1173; B23B 51/123; B25B 33/005; B25G 1/00; B21C 35/02; B21D 28/34; B23P 11/025

USPC ......... 219/635, 677, 644, 676, 652, 637, 643, 219/632, 642, 607, 629, 640, 602, 639, 219/600; 279/128, 147, 102, 9.1, 23.1, 103, 279/158; 29/243, 447
See application file for complete search history.

(56) References Cited

U.S. PATENT DOCUMENTS 4,461,995 A * 7/1984 Harris ........................... 324/224
4,965,041 A * 10/1990 Becker ......................... 376/258
(Continued)

FOREIGN PATENT DOCUMENTS

DE        200 08937         8/2000
DE        101 21 743        11/2002
(Continued)

OTHER PUBLICATIONS

International Preliminary Report, PCT/EP2008/003223, Jan. 12, 2010 (6 pgs.).
(Continued)

*Primary Examiner* — Dana Ross
*Assistant Examiner* — Hemant Mathew
(74) *Attorney, Agent, or Firm* — Holland & Hart LLP

(57) ABSTRACT

The present invention relates to a device for tensioning or de-tensioning tools, having a tool shaft in a tool chuck which has a sheath section open on the free end thereof and which is made of electrically conductive material, for receiving the tool shaft in a friction connection, having an induction coil which surrounds the sheath section of the tool chuck, to which preferably high-frequency alternating current can be applied, and which is designed as a ring or cylinder coil, wherein the device has at least one channel running between the inner peripheral surface of the induction coil and the sheath section of the tool chuck, through which flows a cooling agent which cools the sheath section of the tool chuck.

36 Claims, 4 Drawing Sheets

(51) Int. Cl.
  *H05B 6/14*  (2006.01)
  *H05B 6/06*  (2006.01)

(56) References Cited

U.S. PATENT DOCUMENTS

| | | | | |
|---|---|---|---|---|
| 6,822,206 | B2 * | 11/2004 | Haimer | 219/635 |
| 6,861,625 | B1 * | 3/2005 | Haimer et al. | 219/607 |
| 2006/0163245 | A1 * | 7/2006 | Pfau | 219/635 |

FOREIGN PATENT DOCUMENTS

| | | | |
|---|---|---|---|
| DE | 10121743 A1 * | 11/2002 | |
| DE | 102 53 106 | 6/2004 | |
| DE | 103 48 880 | 5/2005 | |
| DE | 10 2005 003855 | 8/2006 | |
| DE | 10 2005 005892 | 8/2006 | |
| DE | 102005003855 A1 * | 8/2006 | |
| DE | 102005005892 A1 * | 8/2006 | |
| DE | 102005013483 A1 * | 9/2006 | |
| DE | 10 2005 004166 | 10/2006 | |
| DE | 102005004166 A1 * | 10/2006 | |
| DE | 10 2005 025459 | 12/2006 | |
| EP | 1 728 573 | 12/2006 | |
| EP | 1728573 A1 * | 12/2006 | |

OTHER PUBLICATIONS

International Search Report, PCT/EP2008/003223, Jul. 30, 2008 (3 pgs.).

\* cited by examiner

SHRINKING COIL WITH DIRECT TOOL COOLING

CROSS-REFERENCE TO RELATED PATENT APPLICATIONS

This is a continuation of International Patent Application No. PCT/EP2008/003223, entitled "Shrinking Coil with Direct Tool Cooling," filed on 22 Apr. 2008, which claims priority to DE 20 2007 007 837.4, filed on 1 Jun. 2007, both of which are incorporated by reference herein in their entireties.

BACKGROUND

The invention relates to a device for clamping and/or unclamping of tools, comprising a tool shaft in a tool chuck by means of a shrink connection between the tool chuck and the tool shaft.

A device of said type is known e.g. from the German Patent Application DE 103 48 880 A1, which describes the basic configuration and the function of such a device in detail, and which is therefore incorporated by reference into the present patent application.

A general problem of such devices is cooling the tool chuck back down, which has been heated up for clamping or unclamping. This is on the one hand, because the time required for cooling tends to increase the overall time required for the tool change until an operable tool is provided again, on the other hand, because manual removal of tool clamping chucks, which are still hot, is associated with a substantial accident risk.

Therefore, it has already been considered to provide cooling by means of solid cooling bodies, this means by bringing the tool chuck in close contact with another solid body with good heat conducting properties, into which the heat stored in the tool chuck is transferred quickly.

However, such cooling is difficult to accomplish in practical applications. A close surface contact between the chuck and the cooling body has to exist, since heat can only be transferred efficiently that way. The tool chucks or their sleeve sections performing the actual clamping have to have a conical outer contour, since only this way, a sufficiently close contact can be established. With cylindrical chucks, establishing the required surface contact is difficult. In any case, the cooling body and the chuck have to be adjusted to one another. A real integration of the cooling body into the coil unit is not possible. Heating and cooling thus has to be performed at different places, consequently hot chucks need to be handled. It is very difficult to automate such cooling completely or at least to a high extent.

In practical applications, therefore typically, the cooling is performed with water, so that the chuck is removed from the clamping device and submerged in water or showered with water. Also this has significant disadvantages, since in turn, integration into the coil unit is hardly possible, but again the hot chuck has to be handled. Even more so with such cooling, a substantial or complete automation is hardly possible. Furthermore, the whole chuck becomes wet. It has to be cautiously dried subsequently, which is complex. Overall, also for such cooling, a long drying cycle is required.

SUMMARY

Accordingly, it is the object of the invention to improve a clamping or unclamping device of said type, so that the hot chuck is cooled in place, this means without having to pull the hot chuck out of the coil.

This object is accomplished by devices according to patent claim 1 and according to the independent claim. The advantages and the effect in particular also of the particular embodiments provided by the dependent claims can be derived from the subsequent description of the figures for the embodiments.

DRAWINGS

DETAILED DESCRIPTION

Figure 1:
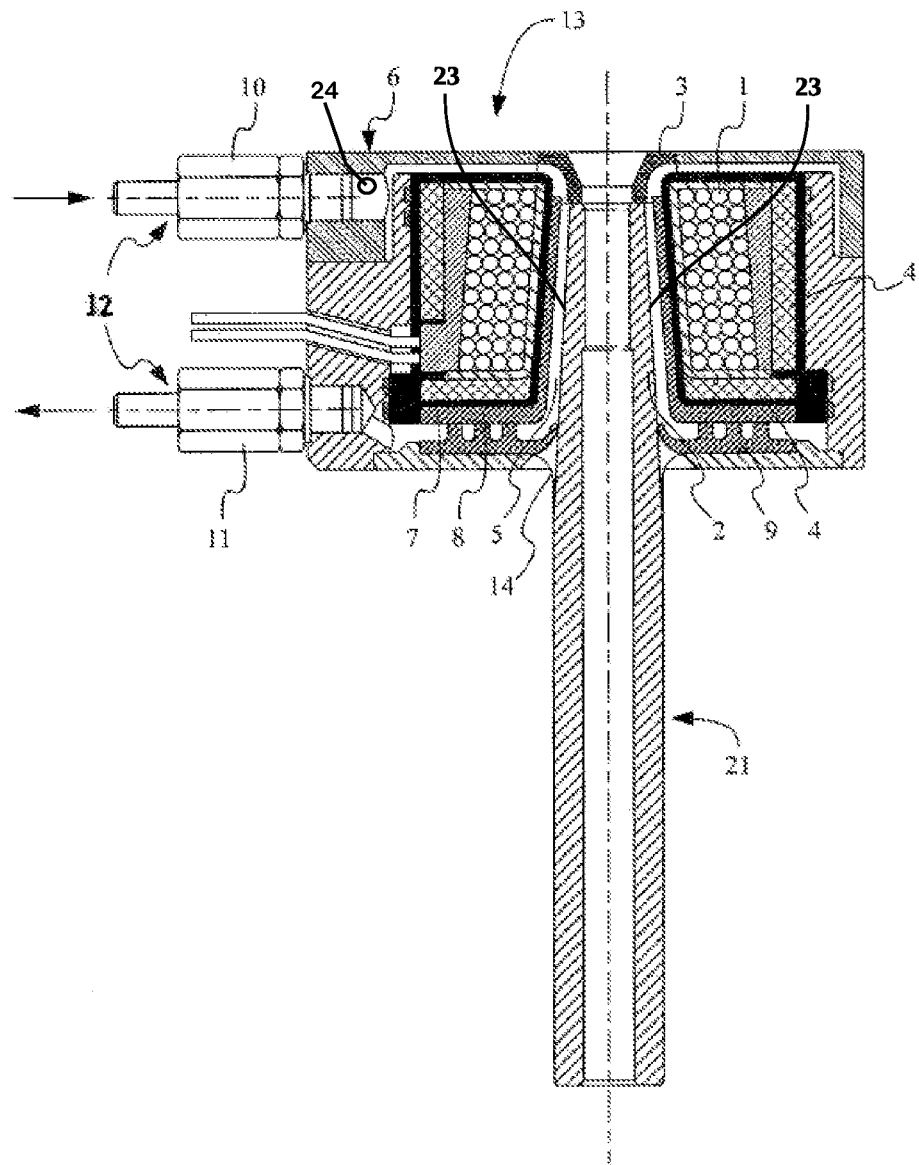
FIG. 1 shows a first embodiment a device for clamping and/or unclamping tools.

FIG. 1 shows a first embodiment of the invention. The induction coil 1 forms a magnetic loop in combination with the field concentrator 3, the sleeve section 2 of the tool chuck and the field conductor devices 4, which magnetic loop heats the sleeve section 2 of the tool chuck 21.

The sleeve section 2 thus forms a cooling channel 5 together with the coil housing 6 surrounding the coil 1. Said cooling channel is e.g. flowed through by water, which is typically mixed with corrosion inhibitors. Also, any other suitable fluid can be used, e.g. a fluid like glycol or a gas or a liquefied gas. The cooling channel extends between the coolant feed conduit 10 and the coolant scavenging conduit 11. When the tool chuck is inserted, the cooling channel is at least substantially sealed relative to ambient.

A section of said cooling channel 5 extends between the inner surface of the induction coil 1, which is protected by a coolant tight encapsulation 7 and by a heat shield 8 (any suitable material, which is neither electrically nor magnetically conductive), and between the sleeve section 2. Thus, the sleeve section directly forms one of the walls 23 of the cooling channel 5, along at least a part of said portion, which provides excellent heat transfer.

In order to implement this, a fold-over seal 14 is provided in the portion of the opening, through which the sleeve section 2 is inserted into the interior of the coil 1. Said seal is configured soft enough, so that it attaches tight to the sleeve section, as soon as it is inserted into the coil. At its upper free face, the sleeve section contacts the opposite surface of the field concentrator 3, which is configured sufficiently precise, with the necessary contact pressure. The contact is configured so that, also here, a sealing is provided, at least substantially, mainly in the sense that only few coolant drops exit during the coolant cycle, which only lasts a couple of moments, so that the sleeve section 2 or the chuck only get a little wet.

The operation of the device is illustrated here with reference to an exemplary unclamping process.

Immediately after ending the heat-up process, the shaft of the tool to be unclamped is extracted from the sleeve section 2.

Then coolant is flushed into the gap 5 through the coolant feed line 10 by means of a coolant pump or by means of the pressure of the coolant reservoir. Said coolant contacts the sleeve section and cools it within a few seconds to a temperature, which facilitates risk free handling of the chuck. Typically, already in this phase, vacuum is applied to the coolant scavenging conduit 11 in order to extract coolant vapor which may have been created. A temperature sensor in the return of the cooling medium can monitor the cooling process, this means ending the cooling process as soon as the back flowing coolant has reached a certain lower temperature limit, or as soon as its temperature doesn't change substantially any more. The end of the cooling process can be indicated acoustically or optically.

The coolant supply is stopped now. Since, now at the latest, vacuum is applied to the coolant extraction conduit 11, the coolant still disposed in the cooling channel 5 is extracted almost without residual. If the coolant supply—and scavenging conduit are configured with the three-way valves, which are not shown here, now compressed air or similar is blown through the cooling channel 5 in order to dry the wetted surface of the sleeve section. Then, the sleeve section is pulled out of the coil and the next cycle can begin by inserting the next sleeve section into the coil so it seals.

It is important that at no point in time, there is a risk of burns for the user, since the hot portion of the chuck is not accessible at any point in time, but it is completely covered by the coil and by the cooling device.

It is a significant advantage of said solution that the outer contour of the sleeve section 2 can vary within certain limits, since due to the direct wetting; no particular requirements have to be placed upon the contour of the sleeve section.

It is a relevant feature, that the induction coil 1 is completely encased through injection molding or vulcanized, so that it is reliably protected against the penetration of coolant or coolant vapor. In order to check the tightness of the encasement compound, a low voltage can be applied to the coil winding during the testing cycle. It is being measured with an opposite electrode 24 in the coolant loop, if a current flows between coil and coolant.

Since the outer diameters of the sleeve sections of the chucks to be shrunk vary highly in practical applications, not all sleeve diameters can be shrunk with a single coil, when using the strong induction coil shown here. Thus, often not only a single coil is included in a device according to the invention, but a coil set with plural coils, which can be exchanged. Each coil advantageously forms a replaceable module 13 together with its housing 6 forming the cooling channel 5. Said module is connected to the rest of the device through a disengagable electrical connection and through quick couplings 12 for the coolant supply that can be operated without tools. It can be installed and removed as a complete modular unit with few manual operations, depending on which sleeve diameter is to be shrunk at the moment. Thus, the entire coolant duct remains with the respective coil, thus it is being installed and removed with it, which facilitates quick and clean handling. The machine operator thus has almost no contact with the coolant. Through the invention, it is also possible, instead of replacing the particular coils, to connect all coils of a coil set to the device, and to actuate only the particular coils when required, this means to supply power to them and to tie them into the coolant loop.

Figure 2:
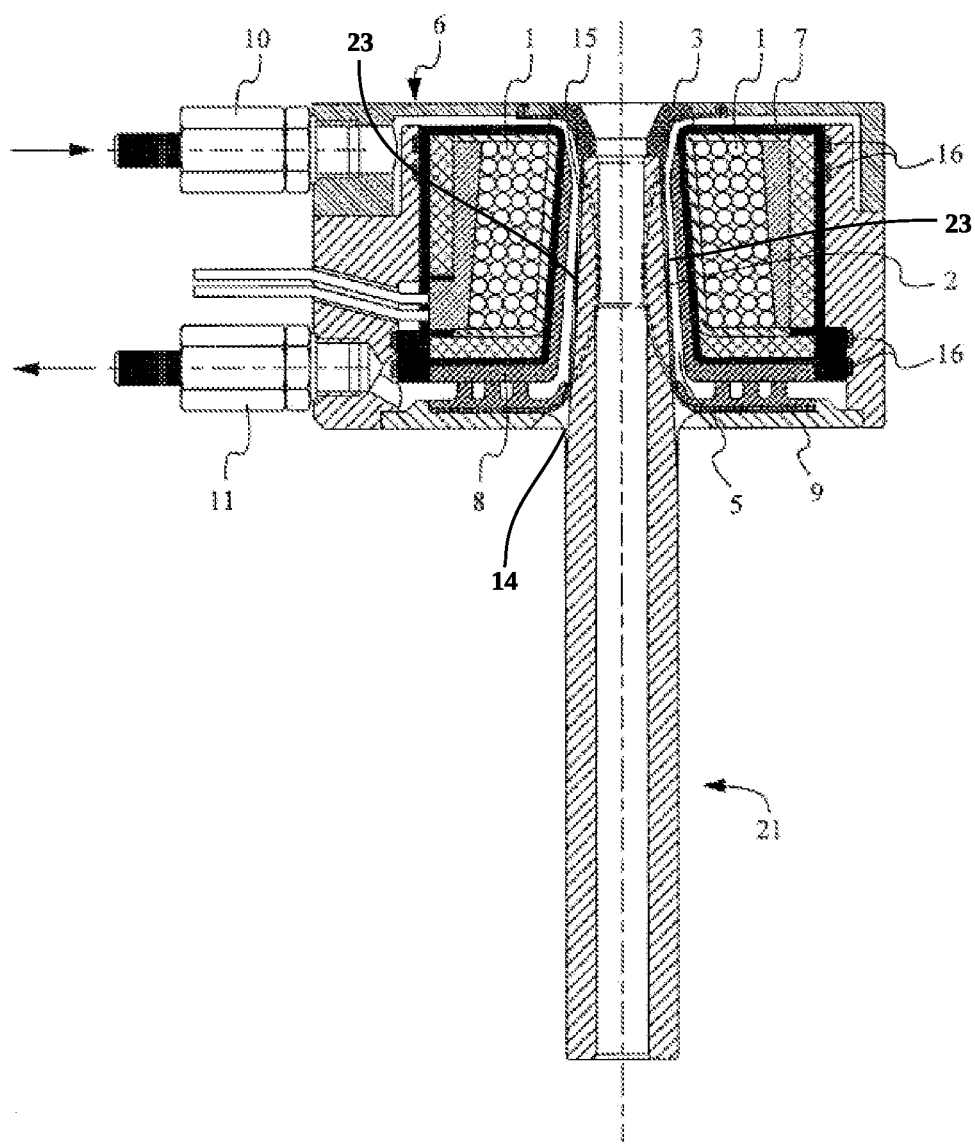
FIG. 2 shows an alternative embodiment of the device for clamping and/or unclamping tools having a sleeve portion that does not come into direct contact with the coolant.

FIG. 2 shows an alternative embodiment of the invention.

The difference to the embodiment illustrated in FIG. 1 is only that the sleeve portion does not come into direct contact with the coolant, but only through a seal membrane 15, or through a seal bellows. Accordingly, also the fold-over seal 14 can be omitted, which, however, is still being used as an additional seal.

Also, in the portion of the field concentrator 3, no particular measures for sealing have to be taken anymore. Also, in this portion, the seal membrane 15 seals, which runs along here, between the coil and the field concentrator, up to the location where it is connected into the coil housing 6 with its drop shaped or bead shaped protrusion.

Differences caused by the function of the seal membrane notwithstanding, the statements made with respect to FIG. 1 apply analogously.

After heating the sleeve section, coolant is pumped through the gap between the coil and the seal membrane 15 for cooling purposes. The seal membrane expands due to the coolant pressure and comes into surface contact with the chuck (the delineation of the seal membrane 15 indicated in dashed lines in FIG. 2 would be established if no chuck or no sleeve section were inserted). The chuck is not wetted and thus does not have to be dried after the cooling process. The coolant flows into a closed loop. No seals are required, which have to contact the sleeve section closely after each cycle, so that a correct sealing against the sleeve section is accomplished, which thus entails the risk of operator errors and wear.

Thus, the cooling device to the extent of the flexibility of the seal membrane also here remains substantially independent from the contour of the sleeve section. Also here, like in FIG. 1, it holds that almost all customary chucks can be cooled, and not only such chucks which are adapted and which form an expensive "system" together with the entire device.

Figure 3:
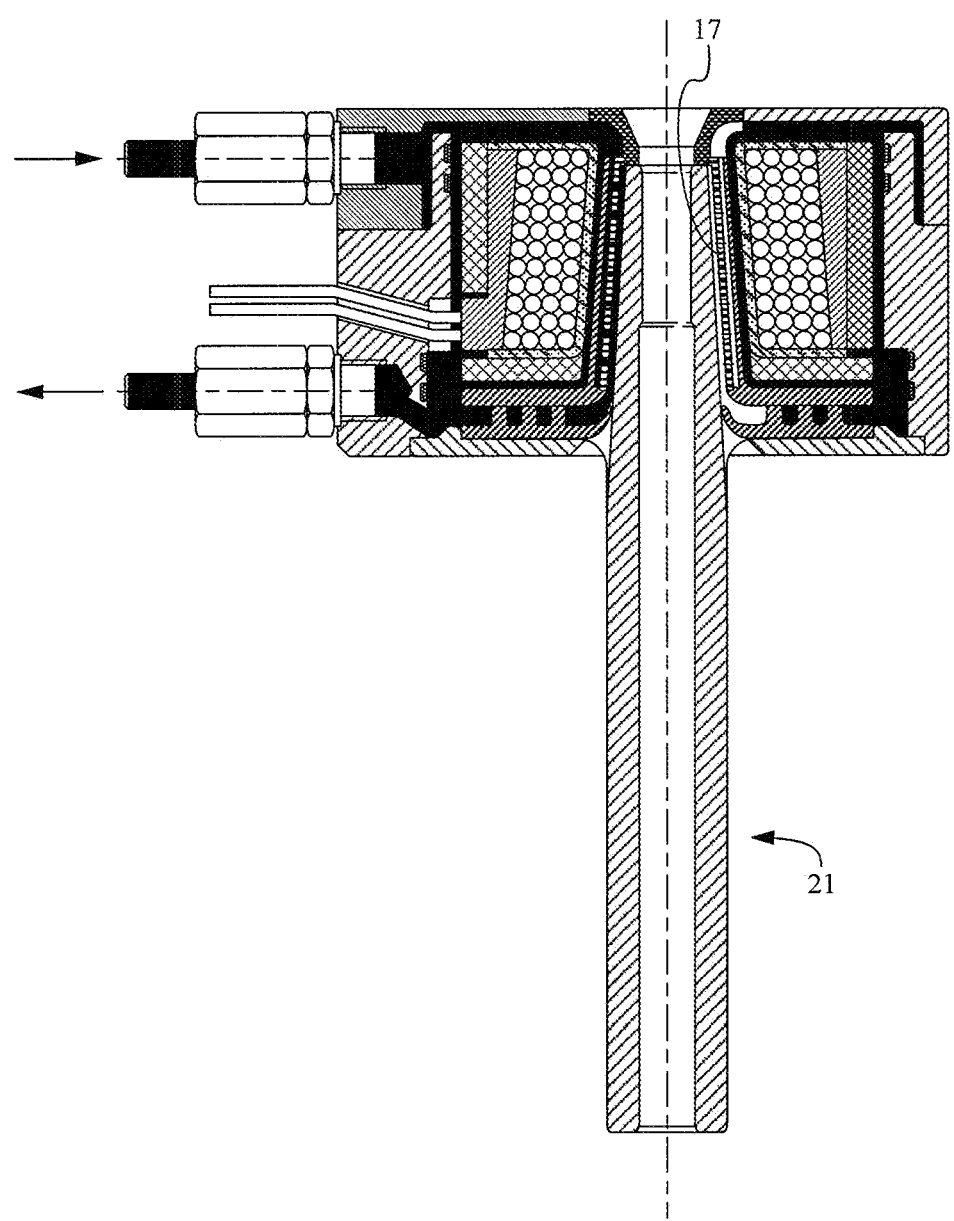
FIG. 3 shows another embodiment of the device for clamping and/or unclamping tools that includes an additional a jet body inserted into the cooling channel.

FIG. 3 shows another embodiment of the invention, which only differs from the embodiment of the invention shown in FIG. 1, in that an additional a jet body 17 is inserted into the portion of the cooling channel 5, which extends as shown between the inner circumferential surface of the coil 1 and the sleeve section 2. Therefore, also here, the statements made with respect to FIG. 1 hold as long as no other requirements result from the principle of the jet body.

The jet body 17 is provided with an inflow channel for the coolant on its side facing the coil winding. Furthermore, the jet body is provided with jet bore holes extending herein substantially in radial direction, through which the coolant pressure established on the side of the inflow channel is substantially relieved and which atomize or fog the coolant in turn and which let it impact the surface to be cooled of the sleeve section 2 in this condition, where the coolant can evaporate. The resulting steam or the downward running coolant or condensate are scavenged through the coolant scavenging line 11.

Said coolant body 17 has the advantage that the required coolant volume can be significantly reduced. The process can thus be easily controlled, so that the coolant mostly evaporates on the hot surface of the sleeve section 2, which is known to cause very high energy transfer, this means effective cooling at a low coolant volume. This can be particularly advantageous, where the system is not operated connected to a coolant network, but where it has to operate with a small coolant supply. Thus, the problem of coolant scavenging may be obviated, since water vapor can generally be simply released into the ambient.

As a matter of principle, it is conceivable that a membrane is also used for the embodiment illustrated in FIG. 3 as illustrated in FIG. 2. Depending on the intensity of the jetting of the membrane, there may be a very high thermal loading of the membrane 15 at times, which needs to be considered.

Figure 4:
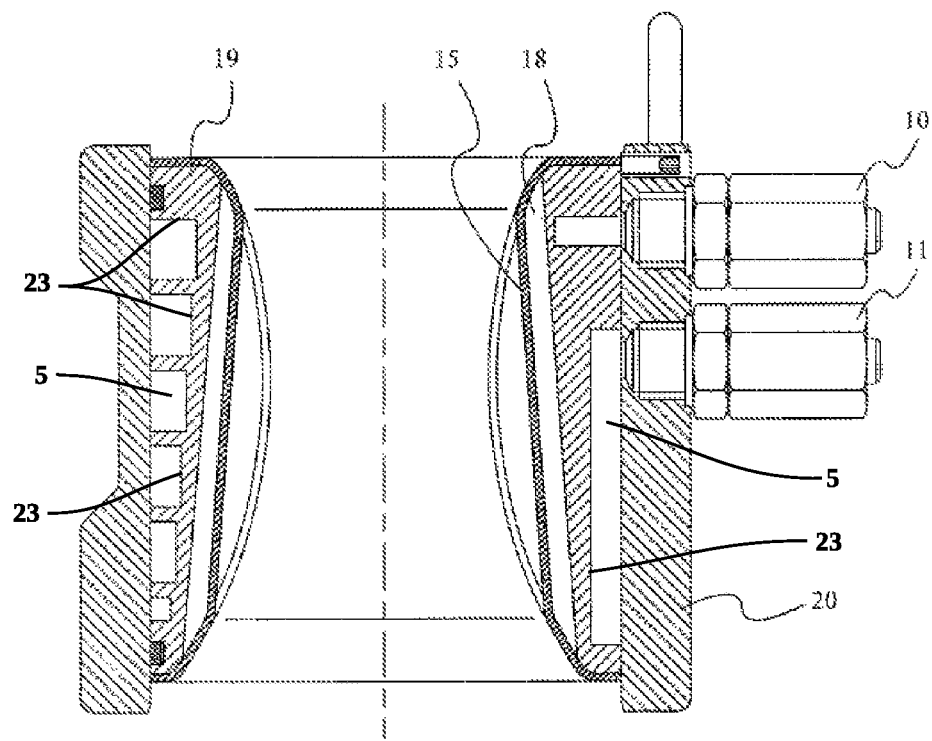
FIG. 4 shows another embodiment of the device for clamping and/or unclamping tools having a removable cooling device.

FIG. 4 shows another embodiment herein, however, not in the form of an integrated cooling device but in the form a separate cooling device. It is comprised of an outer sleeve or collar 20, which is pushed over the sleeve section (sleeve section not shown in FIG. 4), which is already pulled out of the induction coil.

The collar 20 is supplied with coolant through respective connections. A hollow cylindrical body, which is designated as a heat exchanger 19, and which comprises grooves, which form a cooling channel 5 together with the inner wall of the collar, is inserted or pressed into the inside of the collar 20 and sealed relative to the collar by two cord seals 16.

The coolant flowing through said cooling channel 5 in this embodiment, however, does not come into direct contact with the sleeve section, and is not only separated from it by the seal membrane 15 either. Instead, the heat exchange 19 is thus enveloped and sealed by the seal membrane 15, so that a pocket which is sealed on all sides is created between the heat exchanger 19 and the seal membrane 15. Said pocket is preferably filled with a gel type substance 18, which in turn has good heat transfer properties and which operates as an additional coolant.

It is the purpose of said substance to provide close contact with the sleeve section to be cooled. Said substance achieves said purpose by forming an "elastic cushion" in combination with the elastic seal membrane 15 enclosing it, which elastic cushion molds around the sleeve section (in FIG. 4 the contour which the inserted sleeve section assumes is drawn hatched). The contour which is assumed by the elastic cushion in unloaded condition is shown without a hatching. Furthermore, it is another object of said substance to transfer the heat of the sleeve section through the heat exchanger to the coolant flowing in a coolant channel 5.

Such a separate cooling unit has the advantage, that different than during integration, no coolant flows proximal to the current conducting components, thus no respective safety precautions have to be taken. Furthermore, they facilitate synchronous operation, this means while a chuck is still being cooled, and the next chuck in the induction coil can already be heated.

It is easy to understand that the cooling concept, which implements the separate cooling unit shown by FIG. 4, can also be used for integrated cooling devices, which is shown e.g. in FIG. 2, and for which patent protection is also applied for. Said cooling concept in which the risk of an undesired exit of coolant from the cooling channel, e.g. due to damaging the seal membrane 15 can be handled easily, can in particular be used, where a coolant is preferably used instead of water, which coolant is physiologically not without consequences, or which should not leak for other reasons either.

On the other hand, it is evident that the cooling concepts shown in FIGS. 1 through 3 can also be used for a separate cooling unit, as shown in particular in FIG. 4, for which protection is also applied for.

The drawings depicted in the figures are not only rough sketches, but they are already detailed engineering drawings. This is why all features shown in the drawings are relevant for the respective bodies. As a precautionary measure also the illustrated features are made objects of the patent claims.

REFERENCE NUMERALS AND DESIGNATIONS

1 induction coil
2 sleeve section of the tool chuck
3 field concentrator
4 field conductor devices
5 channel (cooling channel)
6 housing of the induction coil
7 encapsulation of the induction coil
8 heat shield for encapsulating the induction coil
9 coolant routing device for intensifying coil cooling
10 coolant feed line
11 coolant scavenging line
12 quick release couplings
13 exchangeable module made of coil 1 and housing 6
14 fold-over seal
15 seal membrane or bellows
16 cord seal
17 jet body
18 contact gel
19 heat exchanger
20 outer sleeve or collar

What is claimed is:

1. A device for clamping and/or unclamping tools comprising:
   a tool chuck including a sleeve section made of electrically conductive material and open at one end;
   an induction coil surrounding the sleeve section of the tool chuck, the induction coil being configured to heat the sleeve section; and
   at least one channel filled with coolant and positioned between the induction coil and the sleeve section of the tool chuck, wherein the sleeve section defines at least a portion of the at least one channel so that the coolant contacts the sleeve section and the portion of the at least one channel defined by the sleeve section is at least substantially sealed relative to ambient; and
   a seal positioned in contact with the sleeve section to at least substantially seal the at least one channel relative to ambient.

2. The device of claim 1 wherein the induction coil includes a field concentrator that contacts and seals the one end of the sleeve section so that substantially no coolant exits the at least one channel where the field concentrator contacts the one end of the sleeve section.

3. A device for clamping and/or unclamping tools comprising:
   a tool chuck including a sleeve section made of electrically conductive material and open at one end;
   an induction coil surrounding the sleeve section of the tool chuck, the induction coil being configured to heat the sleeve section;
   at least one channel filled with coolant and positioned between the induction coil and the sleeve section of the tool chuck; and
   a sealed pocket filled with an additional coolant which is locally fixated, the sealed pocket being positioned between the at least one channel and the sleeve section, wherein heat is transferred from the sleeve section through the additional coolant in the sealed pocket and on to the coolant in the at least one channel.

4. A device for clamping and/or unclamping tools comprising:
   a tool chuck including a sleeve section made of electrically conductive material and open at one end;
   an induction coil surrounding the sleeve section of the tool chuck, the induction coil being configured to heat at least a portion of the sleeve section;
   at least one channel filled with coolant and positioned between the induction coil and the heated portion of the sleeve section of the tool chuck, the at least one channel being at least substantially sealed relative to ambient; and
   a coolant scavenging conduit through which the coolant is extracted from the device;
   wherein the heated portion of the sleeve section defines at least a portion of the at least one channel so that the coolant contacts the heated portion of the sleeve section and the portion of the least one channel defined by the heated portion of the sleeve section is at least substantially sealed relative to ambient.

5. The device of claim 4 comprising a housing enclosing the induction coil, wherein the housing and the induction coil form an exchangeable module and the device comprises a plurality of the exchangeable modules, the modules differing from each other in that an inner diameter of the induction coil of each module is different.

6. The device of claim 4 comprising a coolant feed conduit, wherein the at least one channel forms a closed path through which the coolant flows from the coolant feed conduit to the coolant scavenging conduit.

7. The device of claim 4 wherein the induction coil is encased to prevent the coolant from contacting the induction coil.

8. The device of claim 7 wherein the induction coil is encased in an encasement and wherein the induction coil is protected from excessive heat transfer from the heated portion of the sleeve section by a shield made of a material that is not electrically or magnetically conductive.

9. The device of claim 7 comprising an electrode that is in contact with the coolant and used to detect unwanted current flow between the induction coil and the coolant.

10. The device of claim 4 comprising a jet body including fine bore holes, wherein the coolant passes through the fine bore holes into a cavity formed by the jet body and the heated portion of the sleeve section.

11. A device comprising:
a tool chuck including a sleeve section;
a collar surrounding the sleeve section of the tool chuck; and
at least one channel filled with coolant, the at least one channel being positioned between a wall of the collar and the sleeve section of the tool chuck;
wherein the wall of the collar is the innermost static wall of the collar viewed on a cross-sectional plane that is perpendicular to a longitudinal axis of the tool chuck; and
wherein the sleeve section defines at least a portion of the at least one channel so that the coolant contacts the sleeve section and the portion of the channel defined by the sleeve section is at least substantially sealed relative to ambient.

12. The device of claim 11 comprising a seal positioned between the collar and the sleeve section of the tool chuck to at least substantially seal the at least one channel relative to ambient.

13. The device of claim 11 comprising an induction coil surrounding the sleeve section of the tool chuck, the induction coil being configured to heat the sleeve section.

14. The device of claim 13 wherein the sleeve section is open at one end and the induction coil includes a field concentrator that contacts and seals the one end of the sleeve section so that substantially no coolant exits the at least one channel where the field concentrator contacts the one end of the sleeve section.

15. The device of claim 13 comprising a housing enclosing the induction coil, wherein the housing and the induction coil form an exchangeable module and the device comprises a plurality of the exchangeable modules, the modules differing from each other in that an inner diameter of the induction coil of each module is different.

16. The device of claim 13 wherein the induction coil is encased to prevent the coolant from contacting the induction coil.

17. The device of claim 13 comprising an electrode positioned in the coolant to detect unwanted current flow between the induction coil and the coolant.

18. The device of claim 11 comprising a jet body including fine bore holes, wherein the coolant passes through the fine bore holes into a cavity formed by the jet body and the sleeve section.

19. The device of claim 11 comprising a coolant scavenging conduit through which the coolant is extracted from the at least one channel.

20. The device of claim 11 comprising a coolant feed conduit through which the coolant is supplied to the at least one channel.

21. The device of claim 1 comprising a coolant scavenging conduit through which the coolant is extracted from the at least one channel.

22. The device of claim 1 comprising a coolant feed conduit through which the coolant is supplied to the at least one channel.

23. The device of claim 1 comprising a housing enclosing the induction coil, wherein the housing and the induction coil form an exchangeable module and the device comprises a plurality of the exchangeable modules, the modules differing from each other in that an inner diameter of the induction coil of each module is different.

24. The device of claim 1 wherein the induction coil is encased in an encasement and wherein the induction coil is protected from excessive heat transfer from the sleeve section by a shield made of a material that is not electrically or magnetically conductive.

25. The device of claim 1 comprising an electrode positioned in the coolant to detect unwanted current flow between the induction coil and the coolant.

26. The device of claim 1 comprising a jet body including fine bore holes, wherein the coolant passes through the fine bore holes into a cavity formed by the jet body and the sleeve section.

27. The device of claim 3 comprising a coolant scavenging conduit through which the coolant is extracted from the at least one channel.

28. The device of claim 3 comprising a coolant feed conduit through which the coolant is supplied to the at least one channel.

29. The device of claim 3 comprising a housing enclosing the induction coil, wherein the housing and the induction coil form an exchangeable module and the device comprises a plurality of the exchangeable modules, the modules differing from each other in that an inner diameter of the induction coil of each module is different.

30. The device of claim 3 comprising a heat exchanger positioned between the at least one channel and the sealed pocket.

31. The device of claim 3 comprising a flexible seal membrane forming at least a portion of the sealed pocket.

32. The device of claim 31 wherein the flexible seal membrane contacts and conforms to a surface of the sleeve section.

33. The device of claim 31 wherein the flexible seal membrane includes a high temperature elastomer.

34. The device of claim 3 wherein the induction coil is encased in an encasement and wherein the induction coil is protected from excessive heat transfer from the sleeve section by a shield made of a material that is not electrically or magnetically conductive.

35. The device of claim 3 comprising an electrode positioned in the coolant in the at least one channel to detect unwanted current flow between the induction coil and the coolant.

36. The device of claim 4 wherein the induction coil includes a field concentrator that contacts and seals the one end of the sleeve section so that substantially no coolant exits the at least one channel where the field concentrator contacts the one end of the sleeve section.

* * * * *